UNITED STATES PATENT OFFICE.

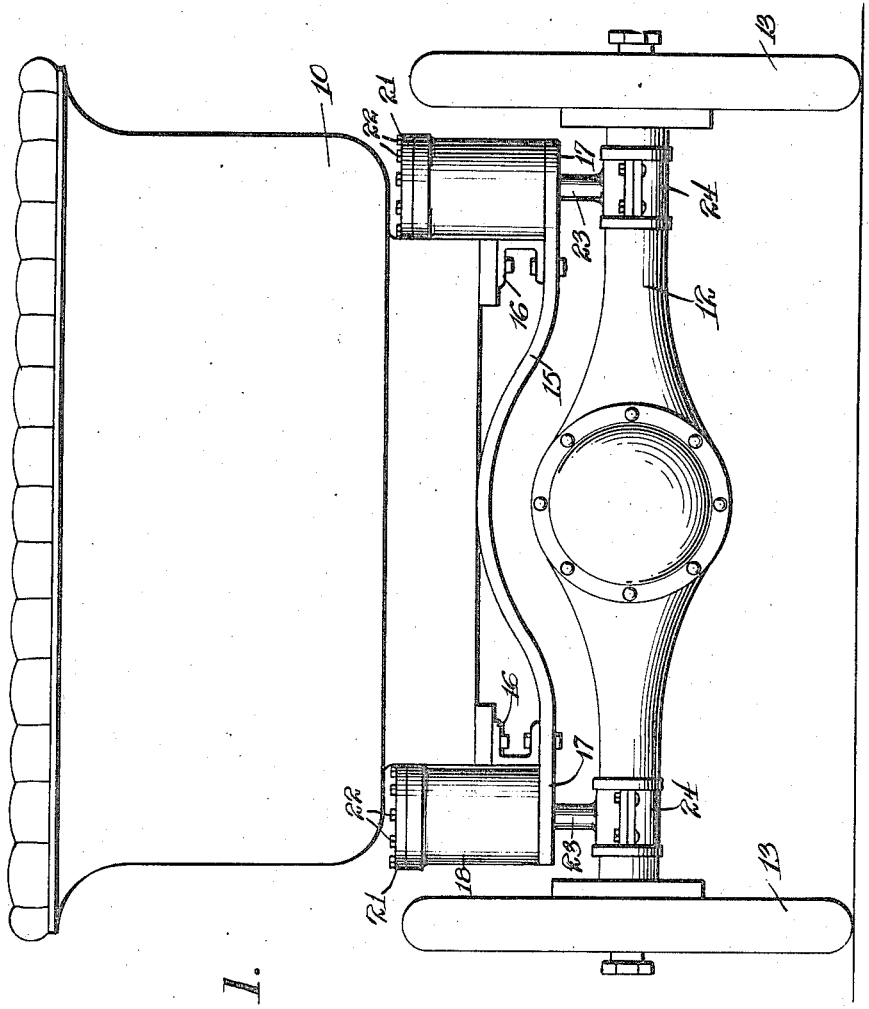

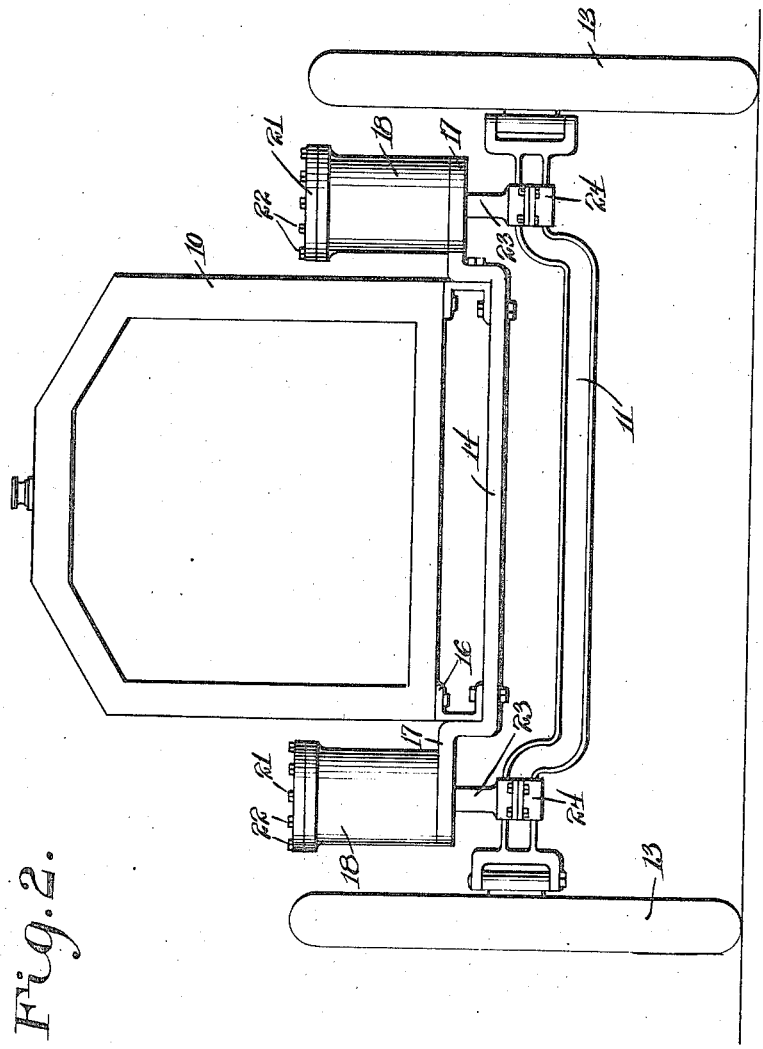

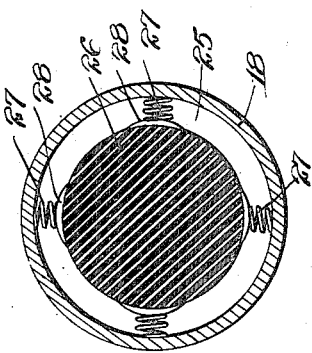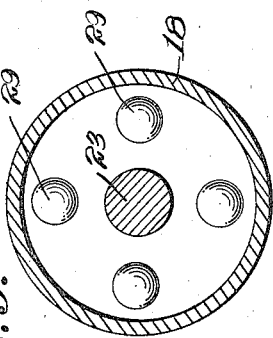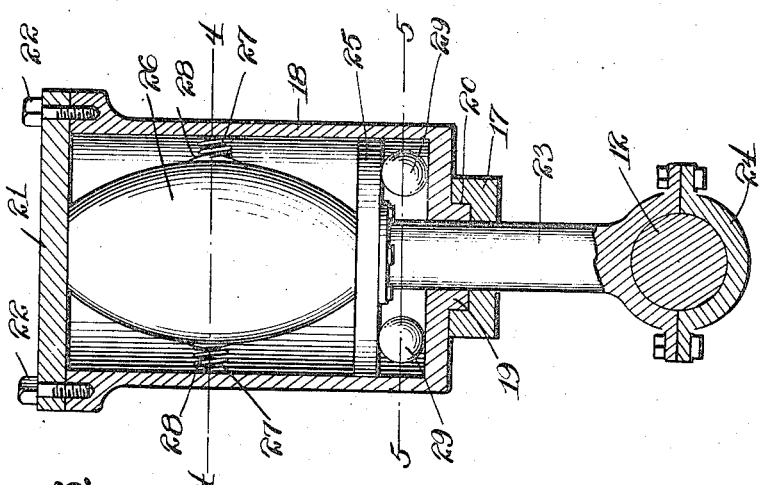

HAROLD T. SMITH, OF COEYMANS, NEW YORK.

SHOCK-ABSORBER.

1,156,376.  Specification of Letters Patent.  Patented Oct. 12, 1915.

Application filed November 14, 1913. Serial No. 801,034.

*To all whom it may concern:*

Be it known that I, HAROLD T. SMITH, a citizen of the United States, residing at Coeymans, in the county of Albany and State of New York, have invented certain new and useful Improvements in Shock-Absorbers, of which the following is a specification.

This invention relates to a shock absorber, and the principal object of the invention is to provide a shock absorber which is so constructed that it may be readily connected with an automobile, and which is so constructed that it can be connected with automobiles which are now on the market.

Another object of the invention is to so construct the shock absorber that it will be very strong and not liable to easily break or wear out.

Another object of the invention is to so construct the absorber that the connecting bar for the cylinders at the ends of the automobile may form supporting bars for the front and rear-end portions of the machine.

This invention is illustrated in the accompanying drawings wherein—

Figure 1 is a rear elevation of an automobile provided with the improved shock absorber; Fig. 2 is a front elevation of an automobile provided with the improved shock absorber; Fig. 3 is a vertical sectional view through one of the shock absorbers; Fig. 4 is a transverse sectional view taken along the line 4—4 of Fig. 3; Fig. 5 is a transverse sectional view taken along the line 5—5 of Fig. 3.

The automobile 10 is provided with front and rear axles 11 and 12 which carry the supporting wheels 13. The shock absorbers are arranged in pairs, two being placed at the rear of the machine, as shown in Figs. 1 and 2 and two at the front of the machine, as shown in Fig. 2. Supporting bars 14 and 15 are secured to the front and rear portions of the automobile by means of the brackets 16 and have their end portions 17 extending beyond the body portion of the automobile. These cross bars 14 and 15 are similar in construction to the cross bars now in use for supporting the forward and rear-end portions of the automobile body, and it will therefore be seen that the shock absorbers can be readily connected with automobiles which are now in use.

Cylinders are carried by the end portions of the bars and are provided with reduced block 26 in the desired position so that the cylinders will be prevented from having any longitudinal or transverse movement upon the bars. If desired, the cylinders can be connected with the body portion of the automobile by any suitable means to brace the cylinders, but this is not absolutely necessary. A removable cap 21 is provided for each of the cylinders, the caps being removably held in place by the machine bolts 22. Pistons 23 are rigidly secured to the axles 11 and 12 by means of the clamp collars 24 and extend into the cylinders 18 through openings formed in the bottoms of the cylinders. A piston head 25 is secured to the inner end of each of the pistons 23 and is of such size that it will just slide nicely in the cylinder. If desired, packing rings can be provided for the head, but this is not absolutely necessary. It should also be noted that if desired, a stuffing box can be provided at the opening through which the piston passes to prevent dust from entering the cylinder.

A substantially elliptical block of rubber or other resilient material is placed in the cylinder between the head 25 and cap 21 and is held in the desired position by means of springs 27 which carry plates 28. These plates 28 engage the sides of the block 26 and prevent all danger of the block moving transversely in the cylinder. Resilient means has been provided for holding the block 26 in the desired position so that the block 26 can be compressed a necessary amount when the piston 23 moves in the cylinder. It is desired to have the head 25 held in spaced-relation from the base of the cylinder and therefore balls of rubber 29 have been placed in the cylinder, as shown in Fig. 3. These resilient balls prevent the jar which might be caused by the return stroke of the piston if the balls were not present. The cylinder is practically airtight and therefore there is no danger of dirt getting into the interior of the cylinder and causing the part to work badly. It should also be noted that the space between the head 25 and cap 21 forms an airtight chamber and that this shock absorber is therefore of the pneumatic type as well as of the resilient type. If it is desired to repair or replace any of the parts of the cylinder, the cap can be easily removed, thus permitting access to be had to the interior of the cylinder.

What is claimed is:

1. A shock absorber comprising a cylinder, a piston slidably mounted in said cylinder, a head at the inner end of said piston, a resilient block positioned in said cylinder between said piston head and one end of said cylinder, resilient means extending from the walls of said cylinder for holding said block in spaced relation to the walls of said cylinder, and resilient means in said cylinder between said piston head and the had to the interior of the cylinder.

2. A shock absorber comprising a cylinder, a piston slidably mounted in said cylinder, an elongated block of resilient material between said piston and one end of said cylinder, yieldable means positioned between said block and the walls of said cylinder for holding said block in spaced relation to the walls of said cylinder, and resilient supporting means between said piston and the opposite end of said cylinder.

3. A shock absorber comprising a housing, a piston slidably mounted in said housing and provided with a head at its inner end, resilient means positioned between the head of said piston and one end of said housing, and means for yieldably holding said resilient means in spaced relation to the walls of said housing.

In testimony whereof I affix my signature in presence of two witnesses.

HAROLD T. SMITH.

Witnesses:
S. H. SHERMAN,
P. H. SMITH.